United States Patent
Honma et al.

(10) Patent No.: US 6,299,952 B1
(45) Date of Patent: Oct. 9, 2001

(54) MOLDABLE SILICONE RUBBER SPONGE COMPOSITION, SILICONE RUBBER SPONGE, AND METHOD FOR PRODUCING SILICONE RUBBER SPONGE

(75) Inventors: Hiroshi Honma; Mitsuo Hamada, both of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/587,852

(22) Filed: Jun. 6, 2000

(30) Foreign Application Priority Data

Jul. 19, 1999 (JP) .................................................. 11-204781
Aug. 26, 1999 (JP) .................................................. 11-239304
Mar. 10, 2000 (JP) .................................................. 12-067112

(51) Int. Cl.$^7$ .................................................. B29D 24/00
(52) U.S. Cl. .................................... 428/36.5; 428/402.21; 428/313.5; 521/91; 521/92; 521/134; 524/268; 524/272; 524/492; 528/32; 264/45.9
(58) Field of Search .......................... 428/402.21, 313.5, 428/36.5; 521/91, 92, 134; 524/268, 272, 492; 528/15, 24, 32; 264/45.9

(56) References Cited

U.S. PATENT DOCUMENTS 4,157,426 * 6/1979 Hatanaka et al. .
5,135,960   8/1992 Higuchi et al. .................... 521/76
5,246,973 * 9/1993 Nakamura et al. .

FOREIGN PATENT DOCUMENTS 0-826723-A2 * 4/1998 (EP) .
10-36544      1/1998 (JP) .

* cited by examiner

Primary Examiner—Robert Dawson
Assistant Examiner—Marc S. Zimmer
(74) Attorney, Agent, or Firm—William F. Boley

(57) ABSTRACT

A moldable silicone rubber sponge composition comprising
  (A) 100 weight parts silicone rubber base compound with a Williams plasticity at 25° C. of 50 to 600 comprising
    (a) 100 weight parts diorganopolysiloxane gum that contains at least 2 alkenyl groups in each molecule and
    (b) 1 to 120 weight parts wet-process silica,
  (B) 0.01 to 50 weight parts hollow gas-containing thermoplastic resin powder, and
  (C) curing agent in an amount sufficient to effect curing of the composition.

The invention is further a silicone rubber sponge afforded by the thermosetting of the above-defined moldable silicone rubber sponge composition and a method for producing the silicone rubber sponge.

17 Claims, No Drawings

MOLDABLE SILICONE RUBBER SPONGE COMPOSITION, SILICONE RUBBER SPONGE, AND METHOD FOR PRODUCING SILICONE RUBBER SPONGE

BACKGROUND OF INVENTION

This invention relates to a moldable silicone rubber sponge composition, to silicone rubber sponge, and to a method for producing silicone rubber sponge.

Silicone rubber sponge, by virtue of its excellent resistance to heat and weathering and its light weight, is used for automotive components such as packings, gaskets, and O-rings; as a surface covering for the rolls used in copiers; and for a variety of sealing materials. A large number of moldable silicone rubber sponge compositions have already been disclosed. For example, Japanese Published Patent Application Sho 44-461 (461/1969) and Japanese Laid Open Patent Application Hei 7-247436 (247,436/1995) teach moldable silicone rubber sponge compositions that contain a thermally decomposable blowing agent as typified by azobisisobutyronitrile. Japanese Laid Open Patent Application Number Hei 10-36544 (36,544/1998) teaches a composition comprising hollow thermoplastic silicone resin particles blended into a liquid silicone rubber composition that evolves gas during its cure. In the case of the former two compositions, however, the decomposition products produced by the thermally decomposable blowing agent during foaming are harmful to humans and thus are problematic from the standpoint of environmental pollution. The silicone rubber sponge produced by the composition taught in Japanese Laid Open Patent Application Number Hei 10-36544 has a poor mechanical strength and hence suffers from limitations in its applications.

The inventors achieved the present invention as the result of investigations directed to solving the problems described above. More specifically, the object of this invention is to provide a moldable silicone rubber sponge composition that during foaming does not generate gas harmful to humans and that curcs to give a silicone rubber sponge that has uniform and microfine cells and a high mechanical strength.

SUMMARY OF INVENTION

A moldable silicone rubber sponge composition comprising
(A) 100 weight parts silicone rubber base compound with a Williams plasticity at 25° C. of 50 to 600 comprising
  (a) 100 weight parts diorganopolysiloxane gum that contains at least 2 alkenyl groups in each molecule and
  (b) 1 to 120 weight parts wet-process silica,
(B) 0.01 to 50 weight parts hollow gas-containing thermoplastic resin powder, and
(C) curing agent in an amount sufficient to effect curing of the composition. The invention is further a silicone rubber sponge afforded by the thermosetting of the above-defined moldable silicone rubber sponge composition and a method for producing the silicone rubber sponge.

DESCRIPTION OF INVENTION

A moldable silicone rubber sponge composition comprising
(A) 100 weight parts silicone rubber base compound with a Williams plasticity at 25° C. of 50 to 600 comprising
  (a) 100 weight parts diorganopolysiloxane gum that contains at least 2 alkenyl groups in each molecule and
  (b) 1 to 120 weight parts wet-process silica,
(B) 0.01 to 50 weight parts hollow gas-containing thermoplastic resin powder, and
(C) curing agent in an amount sufficient to effect curing of the composition. The invention is further the silicone rubber sponge afforded by the thermosetting of the above-defined moldable silicone rubber sponge composition and the method for producing the silicone rubber sponge, said method being characterized by curing the composition by heating to at least the softening point of the thermoplastic resin.

To explain the preceding in greater detail, the silicone rubber base compound (A) used in this invention is the base component of the present composition. The diorganopolysiloxane gum (a) encompassed by component (A) must contain at least 2 silicon-bonded alkenyl groups in each molecule. This alkenyl can be exemplified by vinyl, allyl, propenyl, and hexenyl. The non-alkenyl silicon-bonded organic groups can be exemplified by alkyl groups such as methyl, ethyl, and propyl; aryl groups such as phenyl and tolyl; and halogenated alkyl groups such as 3,3,3-trifluoropropyl and 3-chloropropyl. The molecular structure of component (a) can be straight chain or branch-containing straight chain. This component in general will have a degree of polymerization of 3,000 to 20,000 and will be a gum. Component (a) can be a homopolymer or copolymer or a mixture of these polymers. The units constituting component (a) can be specifically exemplified by the dimethylsiloxane unit, methylvinylsiloxane unit, methylphenylsiloxane unit, and 3,3,3-trifluoropropylmethylsiloxane unit. The molecular chain terminals of component (a) are preferably capped by a triorganosiloxy group or the hydroxyl group. The group present at the molecular chain terminal position in this component can be exemplified by trimethylsiloxy, dimethylvinylsiloxy, methylvinylhydroxysiloxy, and dimethylhydroxysiloxy. The diorganopolysiloxane gum can be exemplified by dimethylvinylsiloxy-endblocked dimethylsiloxane-methylvinylsiloxane copolymer gums, dimethylvinylsiloxy-endblocked dimethylpolysiloxane gums, hydroxyl-endblocked dimethylsiloxane-methylvinylsiloxane copolymer gums, and methylvinylhydroxysiloxy-endblocked dimethylsiloxane-methylvinylsiloxane copolymer gums.

The wet-process silica (b) functions to promote formation of the foam cells during foaming and curing of the present composition and also functions to impart mechanical strength to the cured silicone rubber sponge. Wet-process silica denotes the microparticulate silica produced by a wet process, for example, by neutralization of sodium silicate with acid or decomposition of an alkaline earth metal silicate with acid. Wet-process silicas are already well-known as reinforcing fillers for silicone rubber compositions and are readily acquired in commerce. They are marketed, for example, under such trade names as Nipsil LP (Nippon Silica Kogyo Kabushiki Kaisha), Tokusil USA (Tokuyama Kabushiki Kaisha), and Carplex 50S (Kabushiki Kaisha Shionogi). Wet-process silicas with a BET specific surface area of at least 50 $m^2/g$ are preferred. The wet-process silica (b) also includes wet-process silica whose surface has been treated with, for example, methylchlorosilane, organoalkoxysilane, a silane coupling agent, or hexamethyldisilazane. The wet-process silica (b) preferably has a water content less than 4 weight %. This component is added at from 1 to 120 weight parts and preferably at from 5 to 100 weight parts, in each case per 100 weight parts component (a).

The Williams plasticity at 25° C. of component (A) must be in the range from 50 to 600 and preferably is in the range from 150 to 450. A high tackiness occurs at a Williams plasticity below 50, while a Williams plasticity in excess of 600 results in reduced extrusion moldability.

Component (A) can be exemplified by the material afforded by intermixing components (a) and (b) and subjecting the mixture to aging for an extended period of time; the material afforded by intermixing components (a) and (b) while heating; and the material afforded by intermixing components (a) and (b) while heating and applying reduced pressure thereto. During this preparative step, silanol-functional organosiloxane oligomer, silanol-functional organosilane, or hexaorganodisilazane may also be introduced and admixed as a surface-treatment agent for component (b). This organosiloxane oligomer can be exemplified by hydroxyl-endblocked dimethylsiloxane oligomers, hydroxyl-endblocked methylvinylsiloxane oligomers, hydroxyl-endblocked dimethylsiloxane-methylvinylsiloxane co-oligomers, hydroxyl-endblocked methylphenylsiloxane oligomers, and hydroxyl-endblocked dimethylsiloxane-methylphenylsiloxane co-oligomers. The silanol-functional organosilane can be exemplified by dimethylsilanediol and diphenylsilanediol. The hexaorganodisilazane can be exemplified by hexamethyldisilazane. This component should generally be added at from 0.01 to 5 weight parts for each 100 weight parts component (a).

The curing agent (C) can be an organoperoxide or the combination of a platinum group catalyst with SiH-functional organopolysiloxane crosslinker. The organoperoxide can be exemplified by benzoyl peroxide, tert-butyl perbenzoate, o-methylbenzoyl peroxide, p-methylbenzoyl peroxide, m-methylbenzoyl peroxide, dicumyl peroxide, and 2,5-dimethyl-2,5-di(tert-butylperoxy)hexane. Organoperoxide will generally be added at from 0.1 to 10 weight parts for each 100 weight parts component (A).

The platinum group catalyst encompassed by the platinum group catalyst/SiH-functional organopolysiloxane combination can be exemplified by very finely divided platinum, platinum black, chloroplatinic acid, alcohol-modified chloroplatinic acid, olefin complexes of chloroplatinic acid, complexes of chloroplatinic acid and divinyltetramethyldisiloxane, rhodium compounds, and palladium compounds. The platinum group catalyst will generally be used at from 1 to 200 weight parts as platinum metal for each 1,000,000 weight parts component (A). The SiH-functional organopolysiloxane operates to cure the composition of this invention by addition-reaction with component (a) in the presence of the platinum group catalyst. The SiH-functional organopolysiloxane can be exemplified by trimethylsiloxy-endblocked methylhydrogenpolysiloxanes, trimethylsiloxy-endblocked dimethylsiloxane-methylhydrogensiloxane copolymers, and dimethylhydrogensiloxy-endblocked dimethylsiloxane-methylhydrogensiloxane copolymers. The SiH-functional organopolysiloxane will generally be added in an amount that provides a value of 0.5:1 to 20:1 for the ratio of moles of silicon-bonded hydrogen in this component to moles of alkenyl in component (a). When a platinum group catalyst/SiH-functional organopolysiloxane combination is used as component (C), a compound as known in the art may be added, insofar as the object of this invention is not impaired, as an inhibitor of the catalytic activity of the platinum group catalyst. These inhibitors can be exemplified by 1-ethynylcyclohexanol, 3-methyl-1-pentyn-3-ol, and benzotriazole.

The gas present in the hollow thermoplastic resin powder (B) used by this invention functions to accelerate foaming and at the same time to make the developing foam cells uniform. Component (B) has a thermoplastic resin as its outer shell and contains an inert gas therein. The thermoplastic resin under consideration can be exemplified by silicone resins, acrylic resins, and polycarbonate resins. The softening point of this thermoplastic resin is preferably from 40 to 200° C. and more preferably from 60 to 180° C. The inert gas can be exemplified by air, nitrogen, and helium. As far as the size of component (B) is concerned, its average particle size is preferably from 0.1 to 500 $\mu$m and more preferably from 5 to 50 $\mu$m. Component (B) can be produced, for example, by spraying a dispersion of solvent-dissolved thermoplastic resin and water into a hot gas current from a nozzle in order to drive off the organic solvent concomitant with conversion of the thermoplastic resin into particulate form. Component (B) is added at from 0.01 to 50 weight parts and preferably at from 0.1 to 40 weight parts, in each case per 100 weight parts component (A).

While the composition of this invention comprises the components (A), (B), and (C) described above, it may also contain those additives known in the art for addition to silicone rubber compositions insofar as the object of the invention is not impaired. These additives can be exemplified by reinforcing fillers such as dry-process silicas; semi-reinforcing and non-reinforcing fillers such as diatomaceous earth, powdered quartz, calcium carbonate, mica, aluminum oxide, titanium oxide, and carbon black; pigments such as iron oxide red; heat stabilizers such as cerium silanolate and the cerium salts of fatty acids; flame retardants; plasticizers; and adhesion promoters.

The composition of this invention can be prepared simply by mixing components (A), (B), and (C) and any optional components to homogeneity. Mixers and compounders such as kneader mixers and continuous compounding extruders can be used for this purpose.

In order to produce silicone rubber sponge from the composition of this invention, the composition is cured by heating it to a temperature equal to or greater than the softening point of the hollow thermoplastic resin powder (B). During this process, the composition of this invention undergoes both foaming and curing and thereby forms a silicone rubber sponge containing uniform and microscopic cells. The resulting silicone rubber sponge, because it contains uniform and microscopic cells and has an excellent mechanical strength, can be used, for example, as a gasket, e.g., gaskets for maintaining an airtight condition and fire-resistant gaskets, as a sealing material, for O-rings, and as a surface covering for the rolls used in copiers.

This invention is explained in greater detail below through working examples, in which parts denotes weight parts. The values for viscosity and Williams plasticity reported in the examples were measured at 25° C.

REFERENCE EXAMPLE 1

Distilled water and a solution (30 weight % solids) of a silicone resin dissolved in dichloromethane were intermixed by passage through a dynamic mixer, the distilled water at a rate of 25 cc/minute and the silicone resin-in-dichloromethane solution at 100 cc/minute, to give a water-based dispersion. The silicone resin used to prepare the dichloromethane solution had a softening point of 80° C. and a specific gravity of 1.2 and was composed of the methylsiloxane unit and methylphenylsiloxane unit in a 22:78 molar ratio. The water-based dispersion was continuously sprayed using a dual-fluid nozzle into a spray dryer that used a hot nitrogen gas current. The temperature of the hot nitrogen gas current during this process was 70° C. and the pressure was 0.5 kg/cm$^2$ (0.05 MPa). The resulting hollow silicone resin powder was immersed for 24 hours in an aqueous solution of 100 parts distilled water and 1 part nonionic surfactant (ethylene oxide adduct of trimethylnonanol), and the hollow silicone resin powder that floated was fractionated and collected. The resulting hollow silicone resin powder had an average particle size of 40 $\mu$m, contained nitrogen in its interior space, and had an average shell thickness of 4 $\mu$m.

REFERENCE EXAMPLE 2

A dichloromethane solution containing 10 weight % solids was prepared by dissolving an acrylic resin with a softening point of 85° C. (Elvacite 2008 from DuPont) in dichloromethane. Using a dual-fluid nozzle, this dichloromethane solution and distilled water were continuously sprayed into a spray dryer, the dichloromethane solution at 100 cc/minute and the distilled water at 25 cc/minute using a hot nitrogen gas current as propellant. The temperature of the hot nitrogen current during this process was 80° C. and the pressure was 0.25 kg/cm$^2$ (0.025 MPa). The resulting hollow acrylic resin particulate was immersed for 24 hours in an aqueous solution of 100 parts distilled water and 1 part nonionic surfactant (ethylene oxide adduct of trimethylnonanol), and the hollow acrylic resin powder that floated was fractionated and collected. The resulting hollow acrylic resin powder had an average particle size of 20 $\mu$m, contained nitrogen in its interior space, and had an average shell thickness of 4 $\mu$m.

EXAMPLE 1

The following were introduced into and mixed to homogeneity in a kneader mixer: 100 parts dimethylvinylsiloxy-endblocked dimethylsiloxane-methylvinylsiloxane copolymer gum (weight-average molecular weight=500,000) composed of 99.85 mole % dimethylsiloxane units and 0.15 mole % methylvinylsiloxane units, 45 parts wet-process silica with a BET specific surface area of 130 m$^2$/g (Nipsil LP from Nippon Silica Kogyo Kabushiki Kaisha), and 3 parts hydroxyl-endblocked dimethylsiloxane oligomer with a viscosity of 50 mPa·s. The resulting mixture was heated for 60 minutes at 175° C. to produce a silicone rubber base compound that had a Williams plasticity of 260. A moldable silicone rubber sponge composition was then prepared by mixing the following to homogeneity on a two-roll mill into 100 parts of the silicone rubber base compound: 1 part trimethylsiloxy-endblocked dimethylsiloxane-methylhydrogensiloxane copolymer with a viscosity of 25 mPa·s (molar ratio of silicon-bonded hydrogen in this component to vinyl in the gum=3.3:1), sufficient chloroplatinic acid/divinyltetramethyldisiloxane complex to provide 2 ppm platinum metal, 0.03 part 1-ethynylcyclohexanol as cure inhibitor, and 1 part of the hollow silicone resin powder prepared in Reference Example 1.

This composition was formed into a sheet with a thickness of 2 mm, placed in a 230° C. oven and cured for 5 minutes to give a sheet of silicone rubber sponge. This silicone rubber sponge sheet was evaluated for its expansion ratio and the diameter of the contained cells; the results of these measurements are reported in Table 1 below. The foam cell diameter was measured by sectioning the silicone rubber sponge and inspecting the sectioned surface with a microscope. Measurement of the tensile strength of the silicone rubber sponge according to JIS K-6251 gave a value of 1.9 mPa.

EXAMPLE 2

The following were introduced into and mixed to homogeneity in a kneader mixer: 100 parts dimethylvinylsiloxy-endblocked dimethylsiloxane-methylvinylsiloxane copolymer gum (weight-average molecular weight=500,000) composed of 99.85 mole % dimethylsiloxane units and 0.15 mole % methylvinylsiloxane units, 45 parts wet-process silica with a BET specific surface area of 130 m$^2$/g (Nipsil LP from Nippon Silica Kogyo Kabushiki Kaisha), and 3 parts hydroxyl-endblocked dimethylsiloxane oligomer with a viscosity of 50 mPa·s. The resulting mixture was heated for 60 minutes at 175° C. to produce a silicone rubber base compound that had a Williams plasticity of 260. A moldable silicone rubber sponge composition was then prepared by mixing the following to homogeneity on a two-roll mill into 100 parts of the silicone rubber base compound: 1 part trimethylsiloxy-endblocked dimethylsiloxane-methylhydrogensiloxane copolymer with a viscosity of 25 mPa·s (molar ratio of silicon-bonded hydrogen in this component to vinyl in the gum=3.3:1), sufficient chloroplatinic acid/divinyltetramethyldisiloxane complex to provide 2 ppm platinum metal, 0.03 part 1-ethynylcyclohexanol as cure inhibitor, and 1 part of the hollow acrylic resin powder (average particle size=20 $\mu$m) prepared as described in Reference Example 2. This composition was formed into a sheet with a thickness of 2 mm, placed in a 230° C. oven, and cured for 5 minutes to give a sheet of silicone rubber sponge. This silicone rubber sponge sheet was evaluated for its expansion ratio and contained foam cell diameter as in Example 1 and the results of these measurements are reported in Table 1 below.

EXAMPLE 3

The following were introduced into and mixed to homogeneity in a kneader mixer: 100 parts dimethylvinylsiloxy-endblocked dimethylsiloxane-methylvinylsiloxane copolymer gum (weight-average molecular weight=500,000) composed of 99.85 mole % dimethylsiloxane units and 0.15 mole % methylvinylsiloxane units, 45 parts wet-process silica with a BET specific surface area of 130 m$^2$/g (Nipsil LP from Nippon Silica Kogyo Kabushiki Kaisha), and 3 parts hydroxyl-endblocked dimethylsiloxane oligomer with a viscosity of 50 mPa·s. The resulting mixture was heated for 60 minutes at 175° C. to produce a silicone rubber base compound that had a Williams plasticity of 260. A moldable silicone rubber sponge composition was then prepared by mixing the following to homogeneity on a two-roll mill into 100 parts of the silicone rubber base compound: 0.3 part o-methylbenzoyl peroxide, 0.6 part dicumyl peroxide, and 1 part of the hollow silicone resin powder prepared as described in Reference Example 1. This composition was formed into a sheet with a thickness of 2 mm, placed in a 230° C. oven, and cured for 5 minutes to give a sheet of silicone rubber sponge. This silicone rubber sponge sheet was evaluated for its expansion ratio and contained foam cell diameter as in Example 1 and the results of these measurements are reported in Table 1 below.

EXAMPLE 4

The moldable silicone rubber sponge composition prepared in Example 1 was introduced into an extruder configured for tube extrusion and was extruded to give a tube having an outer diameter of 2 cm and inner diameter of 1 cm, This tube was then introduced into a forced hot-air convection oven and heated for 3 minutes at 250° C. to produce a silicone rubber sponge tube. This silicone rubber sponge tube was cut with a knife and the diameter of the contained foam cells was measured. The cells diameters were in the range from 0.2 to 0.5 mm and were essentially uniform. The expansion ratio was 2.55-fold.

EXAMPLE 5

The following were introduced into and mixed to homogeneity in a kneader mixer: 100 parts dimethylvinylsiloxy-endblocked dimethylsiloxane-methylvinylsiloxane copolymer gum (weight-average molecular weight=500,000) composed of 99.85 mole % dimethylsiloxane units and 0.15 mole % methylvinylsiloxane units, 45 parts wet-process silica with a BET specific surface area of 130 $m^2$/g (Nipsil LP from Nippon Silica Kogyo Kabushiki Kaisha), and 3 parts hydroxyl-endblocked dimethylsiloxane oligomer with a viscosity of 50 mPa·s. The resulting mixture was heated for 60 minutes at 175° C. to produce a silicone rubber base compound. A moldable fire-resistant silicone rubber sponge composition was then prepared by mixing the following to homogeneity on a two-roll mill into 100 parts of the silicone rubber base compound: 30 parts mica powder, 1 part trimethylsiloxy-endblocked dimethylsiloxane-methylhydrogensiloxane copolymer with a viscosity of 25 mPa·s (molar ratio of silicon-bonded hydrogen in this component to vinyl in the gum=3.3: 1), sufficient chloroplatinic acid/divinyltetramethyldisiloxane complex to provide 4 ppm platinum metal, 0.03 part 1-ethynylcyclohexanol as cure inhibitor, and 1 part of the hollow silicone resin powder prepared as described in Reference Example 1. This moldable fire-resistant silicone rubber sponge composition was introduced into an extruder configured for molding gaskets and a fire-resistant gasket of this composition with a diameter of 3 cm was molded. This gasket was placed in a forced hot-air convection oven and heated for 3 minutes at 250° C. to produce a fire-resistant silicone rubber sponge gasket. This fire-resistant silicone rubber sponge gasket was cut with a knife and the diameter of the contained foam cells was measured. The cells diameters were in the range from 0.2 to 0.5 mm. The expansion ratio was 2.25-fold.

EXAMPLE 6

The moldable silicone rubber sponge composition prepared in Example 1 was coated over the circumference of a roll core and the coated roll core was placed in a compression mold designed for roll molding. A silicone rubber sponge-coated roll was then molded by curing the moldable silicone rubber sponge composition by heating for 10 minutes at 170° C. Measurement of the expansion ratio of the silicone rubber sponge coating layer gave a value of 2.55-fold. The foam cells present in the silicone rubber sponge had diameters ranging from 0.2 to 0.5 mm and were essentially uniform.

COMPARATIVE EXAMPLE 1

The following were introduced into and mixed to homogeneity in a kneader mixer: 100 parts dimethylvinylsiloxy-endblocked dimethylsiloxane-methylvinylsiloxane copolymer gum (weight-average molecular weight=500,000) composed of 99.85 mole % dimethylsiloxane units and 0.15 mole % methylvinylsiloxane units, 110 parts wet-process silica with a BET specific surface area of 130 $m^2$/g (Nipsil LP from Nippon Silica Kogyo Kabushiki Kaisha), and, as a surface-treatment agent for the silica, 10 parts hydroxyl-endblocked dimethylsiloxane oligomer with a viscosity of 50 mPa·s. The resulting mixture was heated for 60 minutes at 175° C. to produce a silicone rubber base compound that had a Williams plasticity of 640. A moldable silicone rubber sponge composition was then prepared by mixing the following to homogeneity on a two-roll mill into 100 parts of the silicone rubber base compound: 1 part trimethylsiloxy-endblocked dimethylsiloxane-methylhydrogensiloxane copolymer with a viscosity of 25 mPa·s, sufficient chloroplatinic acid/divinyltetramethyldisiloxane complex to provide 2 ppm platinum metal, 0.013 part 1-ethynylcyclohexanol as cure inhibitor, and 1 part of the hollow silicone resin powder prepared in Reference Example 1. This composition was formed into a sheet with a thickness of 2 mm, placed in a 230° C. oven, and cured for 5 minutes to give a sheet of silicone rubber sponge. Measurement of the expansion ratio on this silicone rubber sponge sheet as in Example 1 gave a value of 1.45-fold.

COMPARATIVE EXAMPLE 2

A moldable silicone rubber sponge composition was prepared as in Example 1, but without addition of the 1 part hollow silicone resin powder that was used in Example 1. The properties of this composition were measured as described in Example 1 and the results are reported in Table 1 below.

COMPARATIVE EXAMPLE 3

A moldable silicone rubber sponge composition was prepared as in Example 3, but without addition of the 1 part hollow silicone resin powder that was used in Example 3. The properties of this composition were measured as described in Example 1 and the results are reported in Table 1 below.

COMPARATIVE EXAMPLE 4

A silicone rubber sponge was produced in accordance with the method described in Japanese Laid Open (Kokai or Unexamined) Patent Application Number Hei 10-67875 (67,875/1998). A liquid silicone rubber base compound was prepared by introducing the following into a mixer and mixing to homogeneity: 100 parts dimethylvinylsiloxy-endblocked dimethylpolysiloxane (vinyl content=0.14 weight %) having a viscosity of 1,000 centipoise, 7 parts hexamethyldisilazane-treated fumed silica having a specific surface of 200 $m^2$/g, and 5 parts hydroxyl-endblocked dimethylsiloxane oligomer having a viscosity of 50 mPa·s. A liquid A was prepared by mixing 100 parts of this liquid silicone rubber base compound to uniformity with 0.4 part chloroplatinic acid/divinyltetramethyldisiloxane complex (platinum content=0.4 weight %) and 5 parts of the hollow silicone resin powder (average particle size=40 μm, average shell thickness=4 pm) whose preparation is described in Reference Example 1. This liquid A was filled into a cartridge. A liquid B was separately prepared by mixing 100 parts of the liquid silicone rubber base compound to homogeneity with 10 parts trimethylsiloxy-endblocked methylhydrogenpolysiloxane having a viscosity of 20 centipoise (silicon-bonded hydrogen content=1.5 weight%), 2 parts 3,5-dimethyl-1-hexyn-3-ol (cure inhibitor), and 5 parts benzyl alcohol (solvent). This liquid B was also filled into a cartridge. Liquids A and B were then mixed to uniformity at a 1:1 ratio by passage through a 12-element static mixer and the product was extruded into a metal frame to produce a 2 mm-thick sheet. This sheet was cured for 1 hour at room temperature to produce silicone rubber sponge. The tensile strength of this silicone rubber sponge measured in accordance with JIS K-6251 was 0.25 MPa.

TABLE 1

|  | Example 1 | Example 2 | Example 3 | Comparative Example 2 | Comparative Example 3 |
| --- | --- | --- | --- | --- | --- |
| expansion ratio | 2.60 | 2.65 | 2.25 | 2.26 | 1.45 |
| cell diameter (mm) | 0.3–0.5 | 0.3–0.6 | 0.2–0.5 | 3.0–8.0 | 2.0–6.0 |
| evaluation of cell uniformity | uniform | uniform | uniform | non-uniform, abnormal foaming | non-uniform, abnormal foaming |

We claim:

1. A moldable silicone rubber sponge composition comprising
   (A) 100 weight parts silicone rubber base compound having a Williams plasticity at 25° C. of 50 to 600 comprising
      (a) 100 weight parts diorganopolysiloxane gum containing at least 2 alkenyl groups in each molecule and
      (b) 1 to 120 weight parts wet-process silica,
   (B) 0.01 to 50 weight parts hollow gas-containing thermoplastic resin powder, and
   (C) curing agent in an amount sufficient to effect cure of the composition.

2. The moldable silicone rubber sponge composition of claim 1, where component (B) has a softening point temperature of 40 to 200° C.

3. The moldable silicone rubber sponge composition of claim 1, where component (B) comprises a thermoplastic resin selected from the group consisting of silicone resin, acrylic resin, and polycarbonate resin.

4. The moldable silicone rubber sponge composition of claim 1, where the wet-process silica has a water content less than 4 weight %.

5. The moldable silicone rubber sponge composition of claim 1 comprising 5 to 100 weight parts of component (b) per 100 weight parts component (a).

6. The moldable silicone rubber sponge composition of claim 1, where component (A) has a Williams plasticity at 25° C. in the range from 150 to 450.

7. The moldable silicone rubber sponge composition of claim 1, where the curing agent is an organoperoxide.

8. The moldable silicone rubber sponge composition of claim 1, where the curing agent comprises a platinum group catalyst and an SiH-functional organopolysiloxane.

9. The moldable silicone rubber sponge composition of claim 1, where the gas contained in the hollow thermoplastic resin powder is an inert gas selected from the group consisting of air, nitrogen, and helium.

10. The moldable silicone rubber sponge composition of claim 9, where the inert gas is nitrogen.

11. A method for forming a silicone rubber sponge comprising heating a composition comprising
    (A) 100 weight parts silicone rubber base compound having a Williams plasticity at 25° C. of 50 to 600 comprising
       (a) 100 weight parts diorganopolysiloxane gum containing at least 2 alkenyl groups in each molecule and
       (b) 1 to 120 weight parts wet-process silica,
    (B) 0.01 to 50 weight parts hollow gas-containing thermoplastic resin powder, and
    (C) curing agent in an amount sufficient to effect cure of the composition, at a temperature equal to or greater than the softening point of the hollow gas-containing thermoplastic resin powder.

12. A silicone rubber sponge prepared by heating a composition comprising
    (A) 100 weight parts silicone rubber base compound having a Williams plasticity at 25° C. of 50 to 600 comprising
       (a) 100 weight parts diorganopolysiloxane gum containing at least 2 alkenyl groups in each molecule and
       (b) 1 to 120 weight parts wet-process silica,
    (B) 0.01 to 50 weight parts hollow gas-containing thermoplastic resin powder, and
    (C) curing agent in an amount sufficient to effect cure of the composition, at a temperature equal to or greater than the softening point of the hollow gas-containing thermoplastic resin powder.

13. A silicone rubber sponge according to claim 12 in the form of a tube.

14. A silicone rubber sponge according to claim 12 in the form of a sheet.

15. A silicone rubber sponge according to claim 12 formed on a substrate.

16. A silicone rubber sponge according to claim 15, where the substrate is a copy roll.

17. A silicone rubber sponge according to claim 12 formed by a process selected from the group consisting of extrusion molding and compression molding.

* * * * *